United States Patent [19]

Homler et al.

[11] 3,897,571

[45] July 29, 1975

[54] PROCESS FOR PRODUCING SLUSH BEVERAGE CONCENTRATE AND PRODUCT

[75] Inventors: Barry Homler, Ossining; Gerald S. Wasserman, Spring Valley, both of N.Y.; James E. Keehner, Salem, Oreg.

[73] Assignee: General Foods Corporation, White Plains, N.Y.

[22] Filed: Dec. 4, 1972

[21] Appl. No.: 311,997

[52] U.S. Cl. ............... 426/327; 426/567; 426/590; 426/592; 426/580
[51] Int. Cl. ...................... A23l 1/00; A23g 5/00
[58] Field of Search .......... 426/164, 327, 190, 365, 426/471, 66, 330

[56] References Cited
UNITED STATES PATENTS

| | | | |
|---|---|---|---|
| 2,619,422 | 11/1952 | Diamond | 426/164 |
| 3,410,694 | 11/1968 | La Flamme | 426/327 X |
| 3,477,244 | 11/1969 | Scoggins | 62/306 |
| 3,503,757 | 3/1970 | Rubenstein | 426/190 X |
| 3,607,307 | 9/1971 | Peyser | 426/327 X |
| 3,619,205 | 11/1971 | Le Van et al. | 62/1 X |

*Primary Examiner*—S. Leon Bashore
*Assistant Examiner*—Kenneth M. Schor
*Attorney, Agent, or Firm*—Bruno P. Struzzi; Thomas V. Sullivan; Michael J. Quillinan

[57] ABSTRACT

Process for producing a slush comestible concentrate wherein a noncrystallizing saccharide mixture is converted into a concentrate that is spoonable and dispersable at 0°F. in water, milk or whiskey forms large water ice crystals and 35-50% overrun during the crystallizing process, cellulose gum being used to reduce phase separation of the slush concentrate and impart desired organoleptic qualities.

14 Claims, No Drawings

PROCESS FOR PRODUCING SLUSH BEVERAGE CONCENTRATE AND PRODUCT

BACKGROUND OF THE INVENTION

Heretofore prior art workers have endeavored to simulate ice "slushes" available at service stands in a take-home product which will not suffer a loss in the "slush" character.

The preparation of a stable take-home type of "liquid-ice" beverage concentrate which makes a cold and frosty drink with addition of either water, milk or alcohol has eluded prior art workers so far as is presently known. The concentrate must be spoonable at freezer temperature, and involve simple filling of a glass and aqueous addition to a portion of the concentrate; the mixture should be readily admixed and quickly and easily made ready to drink. Such a product should have a "cold impact" which results in immediate thirst quenching like slush beverages dispensed from commercial vending machines.

Such preparations are prone to harden into an unspoonable ice block. Consequently, such preparations are not likely to be readily dispersable with simple stirring for dilution purposes. Moreover, the sugar phase of such preparatins separates and accumlates at the bottom of a container and the water ice crystals collect at the top; this is likely to be encountered in national distribution where thermaly cycling in frozen distribution is an unavoidable problem.

STATEMENT OF THE INVENTION

The present invention overcomes these prior art product stability limitations while affording a beverage concentrate of desired organoleptic properties. The invention is founded on identification of compositions and conditions which induce formation of a stable three phase formation of large frozen water ice particles interspersed in a gaseous overrun in syrup concentrate created during the crystallization process. It has been found that these conditions call for partial freezing of the syrup over a period of at least two hours with gentle agitation in a tank-type crystallizer. The large majority of the partially frozen syrup ice particles will have a size of 200 to 500 microns and as oriented in the overrun state will per se by viture of their coarseness contribute to maintaining this overrun condition. It is difficult to specify ice particle shape; the "crystals" should not have the platelet structure characteristic of those fine crystals produced in scraped-surface heat exchangers customarily employed for ice cream making i.e. votators; a majority of the weight of water ice crystal produced in accordance with the present process should be at least 200 microns in all three of the major axes; it being understood the expression crystal is used in a generic sense in accordance with the present specification to apply to water in a frozen state. Essentially, the spoonable slush concentrate will necessarily also have present therein an ionic cellulose gum such as carboxymethyl cellulose or equivalent operative to facilitate overrunning and prevent separation at elevated storage temperatures say as high as +15° to +20°F.

DETAILED SPECIFICATION OF THE INVENTION

For most preferred applications the beverage compositions solids will be a major weight percent of partially inverted sugar syrup, the degree of sugar inversion depending upon the ultimate intended sweetness; the total blend of saccharide will customarily include cane syrup as well as corn syrup. The level of invert sugar solids present will generally exceed 25% by total weight of the beverage solids in accord with the intended shelf life for the slush beverage concentrate product; in most applications wherein a 40% or more invert sugar weight percent of solids is employed a shelf life of at least six months is afforded while retaining the afore-stated desired beverage characteristics.

In effecting the required slush, it is important that the gum added thereto be fully hydrated and dispersed not only to provide intended viscosity for beverage sweetness and mouthfeel but also to assure stabilization of the intended overrun structure produced in crystallization. To assure this condition, the gums will be preferably hydrated and dispersed preparatory to addition of the sugar solids which will be mixed for a period of five to ten minutes or until uniformity is achieved and visible gum lumps are no longer observable. At this time flavors and acids will be added where used.

The beverage concentrate thus produced will have a viscosity at ambient temperatures greater than the intended diluted beverage at such temperatures and a measurable viscosity of 14 millipoises or greater to avoid the dangers of separation mentioned hereinabove, millipoise viscosity being expressed in Brookfield units as determined on an LVT Brookfield viscometer using a low viscosity head at 30 RPM. The concentrate will then be subjected to a commercial sterilization or pasteurization at a temperature of above 160°F. and typically at 175°F. for 30–60 seconds only where the product requires aseptic processing, e.g. chocolate; in most concentrates containing flavoring acids, it will only be necessary to reduce bacteria population by a low temperature cook of 140°–160°F. for 5–20 minutes.

The concentrate will be cooled typically to 27°–32°F preparatory to crystallization. Such cooling may be practiced in a common plate heat exchanger or by passage through a scraped surface heat exchanger, incident to which some small amount of crystallization may be induced although it is preferred to avoid any uncontrollable premature neucleation before introduction to the crystallizing zone.

The beverage will preferably be formulated so as to have an "ice point"; i.e., the point at which ice first forms under non-super cooling temperature reduction conditions, at or below 27°F, the degree of temperature ice point depression being a function of solids and presence therein of other freezing point depressants such as may be optionally used, i.e., acids and alcohols. Generally, it is desirable to have the formulation's ice point significantly reduced by at least 5° below 32°F; of course the higher the solids content the greater the freezing point depression but generally the preferred ice point range in accordance with this invention will range between 25° and 27°F, the lower the ice point the more spoonable the product at 0°F, but the more the hazard of phase separation in storing the ultimate frozen concentrates.

It is preferred to employ a tank-type crystallizer equipped with agitators to gently stir the beverage concentrate therein. The best mode of the invention described hereinafter is a tank-type batch crystallization; however, continuous crystallization can likewise be practiced. The total residence time of the concentrate in the agitated crystallizing tank will be in excess of two hours. And the Surface to Volume ratio of the tank will generally be 0.7 to 2.6 (1/ft.), the tank having a minimum height of 2 feet so as to cause water ice crystals formed during such gentle agitation to be uniformly distributed. The tank will generally be cylindrical and may be fed from the top or the bottom, top feeding being preferred for batch type crystallization.

In addition to crystallization, agitation will result in a critical and essential degree of overrun; it is intended in accordance with this invention that the overrun range between 35% and 50% and optimally be in the neighborhood of 40–50%. Commonly the temperature of enriched concentrate produced by the partial freezing of the water will range at the end of the freezing cycle between 15°–20°F, crystallization being effected by employing a delta T across the heat exchange surface by the crystallizer less than 50°F; this will be achieved by employing a crystallizer having a U factor of 25 to 90, it being understood that such a factor will vary with efficiency of heat transfer, circulation rate of coolant, agitator scraper speed and intended degree of overrun.

In practising crystallization in accordance with the preferred mode of the invention, the agitators will scrape discrete water ice crystals from the surface of the heat exchanger wall causing the crystals per se to be displaced from the wall and grow in a non-supercooled state of circulating syrup. Over a protracted period which will preferably be in the neighborhood of three to four hours small crystals will disappear and large crystals will grow resulting in the aforesaid specified particle size of crystals. For a tank-type crystallizer operating on a batch basis it has been found that an agitator RPM of between 5 and 20 should be employed in a tank having a volume to surface ratio of 1.04 and a height of 8 feet and a diameter of 9 feet.

In some applications it may be desirable in controlling the degree of overrun to develop a tank head-space pressure ranging between 5 inches and 15 inches Hq, typically 8 inches. The purpose of drawing a vacuum is to modulate or control development of overrun in the aforestated specified range. In this connection, also depending upon tank design, it may be desirable to equip the tank with a gas sparging nozzle, say at the lower extremity of the tank so as to control overrun to meet the aforestated 35–50% volume specification. On the other hand, in customary operation of a tank-type crystallization such gas or vacuum practises are not essential provided sufficient surface atmosphere exposure is available to entrain air in the tank.

The slush produced will generally have 75 to 90% of the water originally present in crystal form since this amount of ice broadly is required for "slush" impact in the diluted beverage. This range is important to achieve a stable system wherein the ice is uniformly dispersed in the gaseous phase and the syrup concentrate.

After crystal development the crystallized slush will be transferred under controlled temperatures not to exceed 20°F. to a holding or surge vessel wherefrom the slush concentrate will be discharged into a container to a filling means in accordance with packaging technology known in the art.

The filled container will be blast frozen at −10°F. or below to a "center" temperature of 0°F. or below, the center being the geometric center of the frozen mass; the product should be kept at ambient room temperatures (68°F) for no more than 20 minutes or otherwise handled such that any side wall temperature in any zone contacting the product does not exceed 20°F.; otherwise, phase separation and consequent hard centers with a loss of spoonability and dispersability will be experienced.

A beverage syrup composed of artificial flavoring and coloring ingredients is prepared having the following major ingredients in the range tabulated:

|  | % of Syrup Formula |
| --- | --- |
| Invert Sugar Solids | 7.0–14.0 |
| Sucrose Solids | 7.0–14.0 |
| Hydrolyzed Starch Solids (10–80 D.E.) | 0.0–5.0 |
| Sodium Carboxymethylcellulose Gum | 0.45–0.70 |
| Total Water (including water in sugar syrups) | 72.0–82.0 |

The ingredients are converted into a three phase system following the foregoing description of the preferred process of the invention to produce a product having an overrun of 40%. This system will consist of water ice particles, a continuous base of partially frozen syrup and a discontinuous, microscopically visible distribution of pockets formed by air bubbles when the product is viewed in the frozen state at 0°F.

The incorporation of air or other gaseous medium provides spoonability and in the overrun serves to insulate against transmittance of heat through the product and thereby imparts stability against phase separation by preserving the integrity of the coarse crystal structure. The gum serves to prevent physical separation of the non-frozen matrix syrup phase and thereby contributes toward stability by maintaining uniformity of the tertiary system. The large ice particles of this system serve to prevent fusion of the ice by allowing a relatively thick matrix syrup concentrate wet to exist which maintains the product's ability to be spooned at lowered temperature say about −5° to +5°F and higher as storage occasions; collaterally, this condition also advantageously assures rapid dispersion of the concentrate in the diluting medium to provide convenience in preparation.

This process can be employed advantageously for both naturally and artifically flavored beverage syrup preparation which may be consumed as such and reconstituted. The product may then be formulated from grape, boysenberry, orange, grapefruit and like natural fruit or vegetable juices or extracts high in sugar solids as specified or the product may in imitation thereof with flavoring. Also the product may comprise mixtures of both natural and artifical or vegetable juice and extract preparations.

The preformed formula for an imitation orange drink is:

|  | Parts by Weight |
| --- | --- |
| Water | 68.7 |
| Partially Inverted Sugar | 25.2 |
| Corn Syrup (70 D.E.) | 3.75 |
| Citric Acid, Orange Flavor and Color | 0.64 |
| Sodium Carboxymethyl-cellulose (0.45 parts 7L F* and 0.1 part 7H4 F*) | 0.55 |
| Ascorbic Acid | 0.05 |
| Non-bromenated Oil Cloud | 0.06 |

| | Parts by Weight |
|---|---|
| Sodium Benzoate (3 ppm) | |

*Hercules Powder Co.

What is claimed is:

1. Process for producing a refrigeration-stable slushed comestible concentrate that is spoonable and stirable at 0°F which comprises partially crystallizing a saccharidal, aqueous hydrated gum-containing, viscous solution to form ice crystals having a size of 200 to 500 microns by slowly growing ice crystals after the solution is cooled to below its ice point and continuing said crystallizing process while agitating the solution to induce an overrun of 35–50% and while incorporating a gaseous phase therein until a stable tertiary phase of concentrated syrup matrix interspersed with coarse ice crystals is formed in a gaseous foam at a temperature of 15°–20°F; 75 to 90% of the water originally present in said solution being thereby converted to said ice crystals.

2. Process of claim 1 wherein said crystallizing proceeds over a period of at least two hours.

3. Process of claim 2 wherein a numerical majority of the ice particles have a dimension of at least 200 microns in all three major axis.

4. Process of claim 2 wherein the crystallized solution has an ice point of 25°–27°F.

5. Process of claim 4 wherein the ice is crystallized in a tank having a surface to volume ratio of 0.7 to 2.6.

6. Process of claim 5 wherein the gum is an ionic cellulose gum and said solution has a viscosity of 14 millipoises.

7. Process of claim 1 wherein the saccharide comprise at least 25% invert sugar by weight of the total beverage solids.

8. Process of claim 1 wherein at least 40% of the solution solids are invert sugar.

9. Process of claim 2 wherein said solution has a solids concentration such that it must be cooled at least 5°F below 32°F prior to crystallization and wherein the solution is cooled slowly to below its ice point to cause formation of said ice crystals.

10. The process of claim 9 wherein the crystals are grown in a crystallizer operating at a U factor of 25 to 90 and a delta T of less than 50°F across the heat exchange surface.

11. The process of claim 1 wherein there is an atmospheric pressure of 5 to 15 inches (Hq) on the solution during crystallization.

12. The process of claim 11 wherein the tertiary phase is transferred at less than 20°F from the crystallizing zone to a filling and packaging zone.

13. The process of claim 1 wherein the uncrystallized solution prior to said partial crystallization comprises:

7–14% Invert Sugar Solids
7–14% Sucrose Solid
0–5.0% Hydrolized Starch Solids (10 to 80 D.E.)
0.45–0.7% Ionic Cellulose Gum
72–82% Water 14. The product of the process of claim 1.

* * * * *